United States Patent [19]

Jaycox

[11] Patent Number: 5,117,067
[45] Date of Patent: May 26, 1992

[54] ENVIRONMENTALLY SEALED PEDESTAL

[75] Inventor: Donald F. Jaycox, Riverwood, Ill.

[73] Assignee: Reliance Comm/Tech Corporation, Chicago, Ill.

[21] Appl. No.: 735,104

[22] Filed: Jul. 23, 1991

Related U.S. Application Data

[63] Continuation-in-part of Ser. No. 598,536, Oct. 16, 1990, abandoned, which is a continuation-in-part of Ser. No. 531,879, May 31, 1990.

[51] Int. Cl.$^5$ .............................................. H02G 9/02
[52] U.S. Cl. ................................... 174/38; 174/77 R; 174/87; 174/93
[58] Field of Search ................ 174/37, 38, 77 R, 87, 174/93; 156/49

[56] References Cited

U.S. PATENT DOCUMENTS

| | | | |
|---|---|---|---|
| 3,557,299 | 1/1971 | Dienes | 174/38 |
| 3,725,581 | 4/1973 | Gillemot | 174/38 |
| 3,728,467 | 4/1973 | Klayum et al. | 174/38 |
| 3,769,443 | 10/1973 | Pierzchala et al. | 174/38 |
| 3,848,074 | 11/1974 | Channell | 184/38 |
| 3,919,460 | 11/1975 | Neail et al. | 174/87 |
| 4,488,013 | 12/1984 | Ziegler | 174/51 X |
| 4,631,353 | 12/1986 | Marks | 174/38 |
| 4,634,207 | 1/1987 | Debbaut | 174/76 X |
| 4,902,855 | 2/1990 | Smith | 174/77 R |
| 4,982,052 | 1/1991 | De Bruycker et al. | 174/87 |

FOREIGN PATENT DOCUMENTS 2116007 10/1972 Fed. Rep. of Germany .... 174/77 R

OTHER PUBLICATIONS

*Getting to the Root of Pedestal Problems: Help is on the Way*, Outside Plant Magazine, Jan. 1991, pp. 33, 34, 36.
Channell Commercial Corporation Product Bulletin, New CPT-920 Series Channell Pedestal Terminal. (No date).
*Confronting Corrosion*, Burke, Ed, TE&M Magazine Aug 1, 1990, pp. 54–59.
PST Pedestal Splice Closure, Instruction Bulletin. Issue 4 Jul. 1987.

Primary Examiner—Morris H. Nimmo
Attorney, Agent, or Firm—Trexler, Bushnell, Giangiorgi & Blackstone, Ltd.

[57] ABSTRACT

A reenterable protective housing for protecting telecommunications equipment from detrimental environmental effects contains a reenterable splice enclosure. The protective housing includes a base portion, a bulkhead member, a dome member selectively attachable to the bulkhead member and a sealing assembly for selectively sealing the dome member to the bulkhead member. The dome is selectively reenterable for access to the contents thereof while maintaining the splice enclosure in a sealed condition. The splice enclosure is selectively engageable with the bulkhead member for providing reenterable access to splice connections retained therein.

21 Claims, 5 Drawing Sheets

ENVIRONMENTALLY SEALED PEDESTAL

CROSS-REFERENCE TO RELATED APPLICATION

This is a continuation-in-part of earlier application Ser. No. 07/598,536, filed Oct. 16, 1990, which is a continuation-in-part of application Ser. No. 07/531,879, filed May 31, 1990.

BACKGROUND OF THE INVENTION

This invention relates to the telecommunication arts and more specifically to an apparatus and method for sealing a reenterable splice enclosure and related service connections in a reenterable protective housing to protect both splices and service connections against detrimental environmental effects.

Dependency upon telecommunications and data communications presses the technology to provide consistent high quality communications with minimal down time. A key to providing high quality communications with minimal down time is the protection of installations at critical points and provision for quick and efficient in-field repairs.

In the delivery of telecommunication services it is common to install multi-carrier primary cables to provide communication service to a predetermined area. The primary cable consists of a number of individual binder groups consisting of multiple line pairs. At specific points along the primary cable, connections must be made to route individual wire pairs to end user locations. Primary cables are typically very long continuous cables and are not conveniently manufacturable with specific lengths between predetermined break off points. Specific binder groups are extracted from the primary cables and their line pairs are spliced to a secondary cable. The secondary cable is joined to a service cable at a terminal block. The service cable is then routed to an end user location.

The splice connection between the secondary cable and the primary cable wire pairs and the terminal block connections must be protected from the environment since moisture, oxygen, chemicals (both natural environmental and man-made pollutants) and the accumulation of dust and dirt may individually or cumulatively act to damage the splice and terminal block connections. Typically, prior art telecommunications housings protect a portion of primary cable and connections in what is referred to as a "pedestal". A pedestal has an elongated sleeve-like cover structure having a closed end and an open end which is positioned over the splice connections and terminal block. To protect the splice connections and the terminal block from detrimental environmental effects, the open end of the pedestal cover must be sealed relative to the pedestal and relative to entering and exiting cables.

Current pedestal sealing technology can be yet further improved to improve telecommunications quality, to minimize down time for or field service repairs to improve accessibility for field servicing and to improve the reliability of the installation following field service or repairs. For example, in one typical prior art arrangement, the seal which seals the pedestal cover to its base is the only reenterable seal for both the splice connections and the service connections. The problem with this sealing arrangement is that access to splice connections is not required every time a worker works on the service connections. The splice connections may be sealed with tape, sealants and the like and hence are difficult to access. When only the service connections need to be accessed but not the splice connections, the splice connections are nonetheless exposed unnecessarily, thereby potentially decreasing their integrity. Since the splice and service connections are extremely important to the integrity of the system it is desirable to avoid unnecessary exposure of either.

Another example of a prior art pedestal arrangement is shown in U.S. Pat. No. 4,902,855 to Smith. In this prior art arrangement, the cables are inserted into a pedestal and the open end is sealed. Sealing is accomplished through a labor intensive tape wrapping process. This method forms a seal which is inherently non-uniform thereby creating potential for problems with the fit inside of the pedestal and/or any circumferential compression fitting or clamp used to engage and seal the structure. Further, depending upon the type of tape used, ground wires may have to be separately wrapped prior to incorporation into the common seal. The sealing arrangement formed is then inserted into the open end of the pedestal and a shrink tubing is positioned and shrunk around the outside of the dome to retain the sealing member therein. Alternatively, a clamp may be used, as shown in the above-mentioned patent to Smith.

As mentioned above, this type of prior art sealing system is inherently extremely time consuming and material intensive. Further, this system risks cutting or otherwise damaging cable jackets in attempting to remove the shrink tubing as well as the sealing member when repairing or modifying splice connections. Additionally, sufficient supplies such as tapes and shrink tubing must always be on hand to avoid further delays when installing or repairing splice connections.

Other prior art arrangements make use of grommet like members, which must be carefully cut to size and fitted with the cables and which require additional lubricants for installation. These grommets must be press fitted within a bulkhead opening and circumferencially or radially compressed about a cable or cables for sealing. This arrangement may also require additional taping of cables and the application of additional viscous sealants. This arrangement does not permit easy reentry once the enclosure is sealed. Nor can the sealing materials, grommets, etc. be reused after reentry, rather, the entire above-described process must be repeated employing a new grommet or grommets and other materials.

Several problems arise with the prior art in the installation of the pedestal. Primary cables are typically laid in the ground by a cable-laying contractor. This contractor also brings out a loop of cable at each location where a pedestal is to be installed. After the cables have been laid, the telecommunications company provides a skilled installer to form the appropriate cable splices and connections required at each pedestal location. Each pedestal location may be very complex and require a substantial number of cable splices and connections. It can be seen that the division of labor regarding the installation of the cable and the connection of the cable is quite well-defined.

However, some prior art pedestal designs require completion of all of the splice connections upon initial installation of the pedestal base and protective dome. It would be preferable to provide an apparatus which would permit initial installation of the pedestal base and dome by the cable-layer, leaving the removal of the cable sheath and splicing for the qualified technician.

This problem with some prior art designs occurs because of the nature of the primary cables. Primary cables may include hundreds of small individual wires which are quite flexible but which are surrounded by a relatively rigid protective sheath. When a pedestal is installed, typically there is a base, a bulkhead, and a dome portion. In the above-mentioned prior art design, the bulkhead and base member are an integral piece. The sheath-covered cable is typically much too rigid to insert the loop brought up by the contractor through an aperture formed through the bulkhead to receive the cable. Thus, the prior art design requires the stripping of the sheath from the cable by the skilled technician in order to install the pedestal, since allowing the relatively unskilled cable-installer perform the sheath-stripping operation could cause damage thereto.

The complications discussed above are further increased due to the nature of the underground communications cable network. The pedestals are typically the most conveniently available access node to the cable network, and therefore are extremely important in the integrity and operation of the network as a whole. If the pedestal is installed by the cable-laying contractor, the primary cable may be damaged due to the lack of training and skill in such technically precise operations. If the connection technication is left to install the pedestal the loop of primary cable protruding from the ground is left unprotected until the pedestal is installed. Further, the connection technician's time is not economically spent in the manual, relatively unskilled job of installing the base of the pedestal thereby increasing telecommunications costs due to labor inefficiencies.

OBJECTS AND SUMMARY OF THE INVENTION

It is an object of the present invention to provide an easily enterable and resealable pedestal type enclosure for protecting sealed cable connections retained therein.

Another object of the present invention is to provide a sealing apparatus which facilitates ease of access to the connections for providing efficient access and resealing of the enclosure.

A more specific object of the present invention is to provide a reusable sealing member which is axially compressed to create sealing forces between an opening and cables projecting therethrough, without the use of additional sealants, taping, or the like.

Briefly, and in accordance with the foregoing, the present invention comprises a sealed reenterable protective housing for protecting telecommunications equipment from detrimental environmental effects and containing a reenterable splice enclosure. The protective housing includes a base portion, a bulkhead member mounted to said base portion, a dome member selectively attachable to the bulkhead member and sealing means for selectively sealing the dome member to the bulkhead member. The dome is selectively reenterable for accessing the contents thereof while maintaining the splice enclosure in a sealed condition. The splice enclosure is selectively disengageable from the bulkhead member for providing reenterable access to splice connection retained therein.

BRIEF DESCRIPTION OF THE DRAWINGS

The organization and manner of the operation of the invention, together with further objects and advantages thereof may be understood best by reference to the following description taken in connection with the accompanying drawings wherein like reference numerals identify like elements and in which.

DETAILED DESCPRTION OF THE ILLUSTRATED EMBODIMENT

While this invention may be susceptible to embodiment in different forms, specific embodiments of the present invention are shown in the drawings and will be described herein in detail with the understanding that such disclosure is to be considered an exemplification of the principals of the invention, and is not intended to limit the invention to the embodiments illustrated and described herein.

It should be noted that dimensional relationships between members of the illustrated embodiment may vary in practice or may have been varied in the illustrations to emphasize certain features of the invention.

Figure 1:
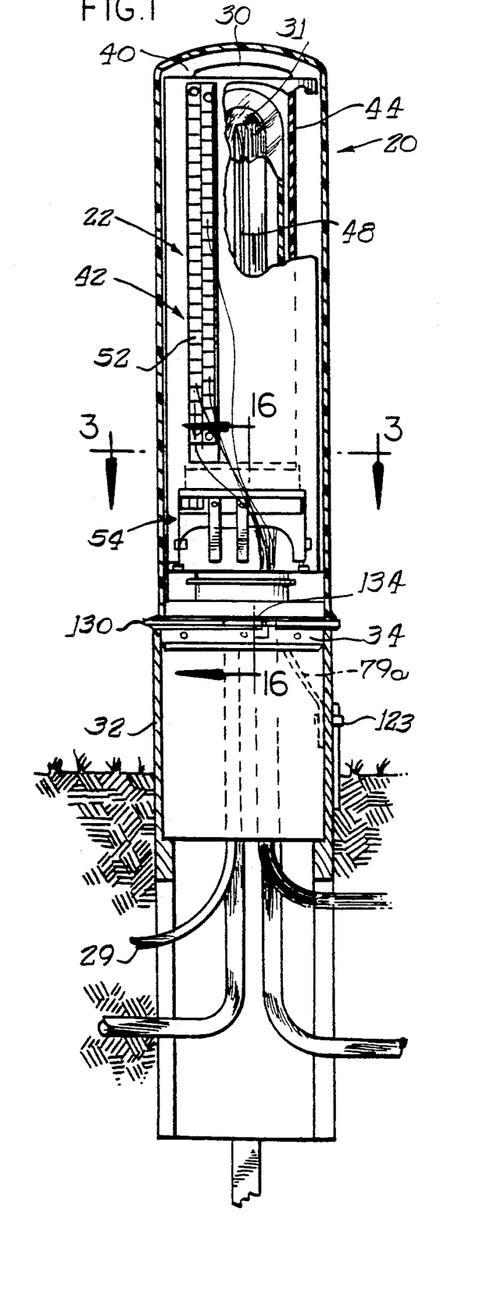
FIG. 1 is partially broken away side view of an environmentally sealed pedestal which is constructed in accordance with the present invention.
Figure 2:
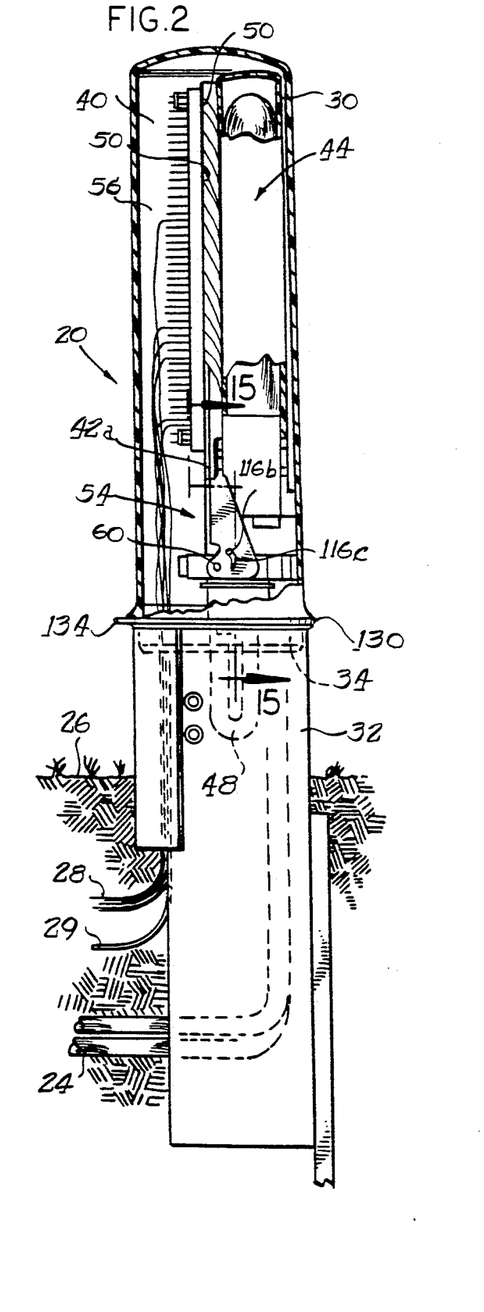
FIG. 2 is a partially broken away side view of the environmentally sealed pedestal rotated approximately 90° from the view illustrated in FIG. 1.

A reenterable protective housing or environmentally sealed pedestal 20, is illustrated in FIGS. 1 and 2. The housing or pedestal 20 is used to protect telecommunications equipment 22 from detrimental environmental effects. A primary cable 24 is buried beneath the surface of the ground 26 to protect the cables from the surrounding environment as well as to remove the cables from sight for aesthetic purposes. At a position along the primary cable 24 where it is determined that service drops or cables 28 and/or a field cable 29 must be run from the primary cable 24, a loop 30 is formed in the primary cable 24. The pedestal 20 is installed to contain the looped portion 30 as well as splice connections 31 made thereto and any additional telecommunications equipment 22 necessary for distribution of communications from the pedestal 20 to the service cable 28 and/or field cable 29.

The pedestal 20 includes a base portion 32, a separate bulkhead member 34 which is removably attachable to the base portion 32, and a hollow dome member 36 having an open end 38 releaseably sealable with the bulkhead member 34. The base portion 32 is preferably formed of metal and extends a distance below the surface of the ground 26 providing support for the pedestal 20, protection of the primary cables 24 and loop 30 passing through and into the pedestal 20, and a potential ground path to the surrounding area. An environmentally sealed primary compartment 40 is formed inside of the dome 36 when the dome 36 is sealed to the bulkhead 34. A wire-routing and connecting portion 42 and a sealed reenterable splice enclosure 44 are positioned inside of the primary compartment 40 and operatively attach to the bulkhead 34. The loop portion 30 of the primary cable 24 is positioned inside of the reenterable splice enclosure 44 and splice connections 31 are made to selected wires of the primary cable 24. A secondary cable 48 and/or a field cable 29 which have been spliced to the primary cable 24 pass out of the splice enclosure 44. The secondary cable 48 connects to the service cable 28 at the connecting portion 42. The field cable 29 exits through the bulkhead 34 and base 32 to be terminated or connected elsewhere. The splice enclosure 44 is attached to the bulkhead 34 in a reenterably sealed fashion so that even when the dome 36 is removed from the bulkhead 34 the splice connections 31 contained inside of the splice enclosure 44 are protected from detrimental environmental effects.

The secondary cable 48 extend out of the splice enclosure 44 and its individual wires connect to a rear side 50 of the connecting portion 42 (as better shown in FIG. 2). In the preferred embodiment as illustrated, the connecting portion 42 includes a rigid plate member 42a which can be configured to accept one or more terminal blocks 52 of any of a broad range of configurations and is mounted on a bracket 54. The organization of the terminal blocks 52 permits attachment of the secondary cable 48 connections to the rear side 50 of the terminal blocks 52 and connection of the service cables 28 to a front side 56 of the terminal blocks 52. The service cables 28 connected to the front side 56 of the terminal blocks 52 extend out of the primary compartment 40 through a service cable aperture 58 formed through the bulkhead 34 and are routed out through the base portion 32 to predetermined locations.

The bracket 54 is formed to permit pivotal movement for selective positioning of the connecting portion 42 when the dome 36 is removed from the bulkhead 34. For example, when the dome 36 is removed from the bulkhead 34 the connecting portion 42 may be moved away from the splice enclosure 44 generally pivoting downwardly away therefrom about a pivot pin 60. Selective positioning of the connecting portion 42 permits complete access to the looped portion 30 of the primary cable 24, the splice connections 31 and secondary cable 48 retained inside of the splice enclosure 44. Such access permits efficient operation on the contents of the splice enclosure 44 as well as connections on the rear side 50 of the connecting portion 42.

Importantly, and as will be described in further detail hereinafter, the splice enclosure 44 is sealed to the bulkhead 34 independently of a seal between the dome member 36 and the bulkhead 34. Such independent sealing permits access to the primary compartment 40 to operate on the connecting portion 42 without disturbing or exposing the contents of the splice enclosure 44 to detrimental environmental effects. Further, selective positioning of the connecting portion 42 further prevents disturbance of the splice enclosure 44 when the connecting portion 42 is operated upon.

Figure 3:
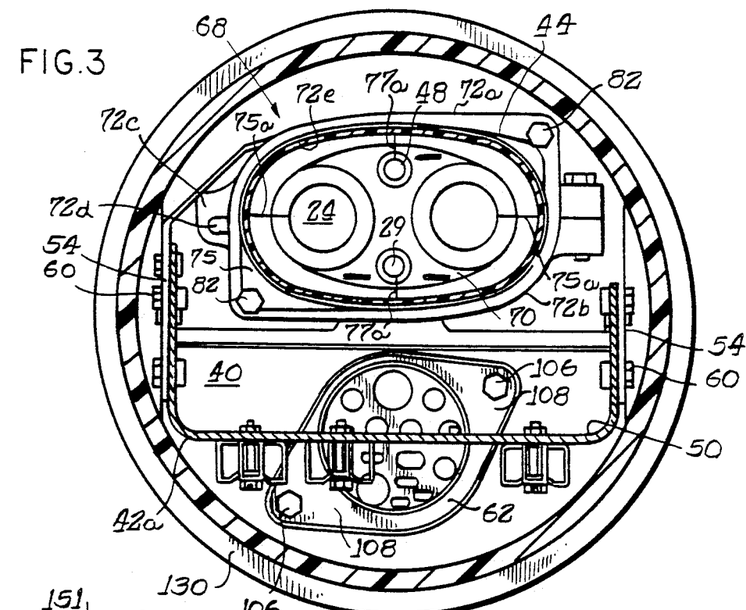
FIG. 3 is an enlarged cross-sectional view of the environmentally sealed pedestal taken approximately along line 3—3 in FIG. 1.

The pedestal 20 is cross-sectioned along line 3—3 in FIG. 1 resulting in the view (enlarged) as illustrated in FIG. 3. It should be noted that cables passing through the bulkhead have been omitted from FIG. 3 in the interest of clarity. The splice enclosure 44, connecting portion 42 and bracket 54, and a compression member or sealing plate 62 are positioned relative to the bulkhead member 34 to provide efficient access to all of the components retained in the primary compartment 40.

Figures 4, 5, 6:
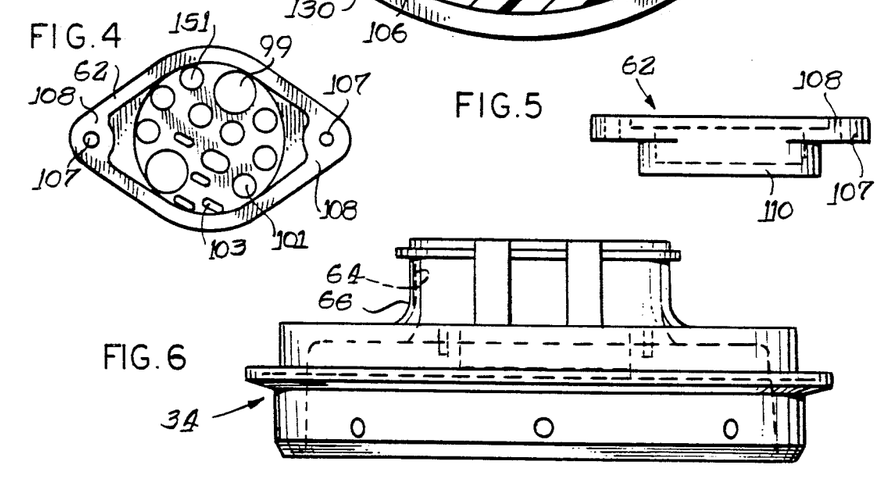
FIG. 4 is a plan view of a cable sealing plate or compression member as shown in FIG. 3.
FIG. 5 is a side view of the cable sealing plate shown in FIG. 4.
FIG. 6 is a front view of a bulkhead used in the environmentally sealed pedestal of the present invention.
Figure 7:
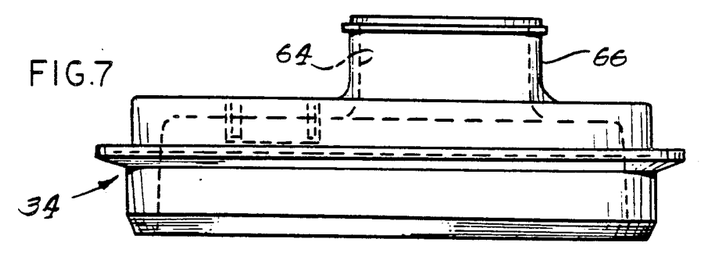
FIG. 7 is a side view of the bulkhead as shown in FIG. 6.
Figure 14:
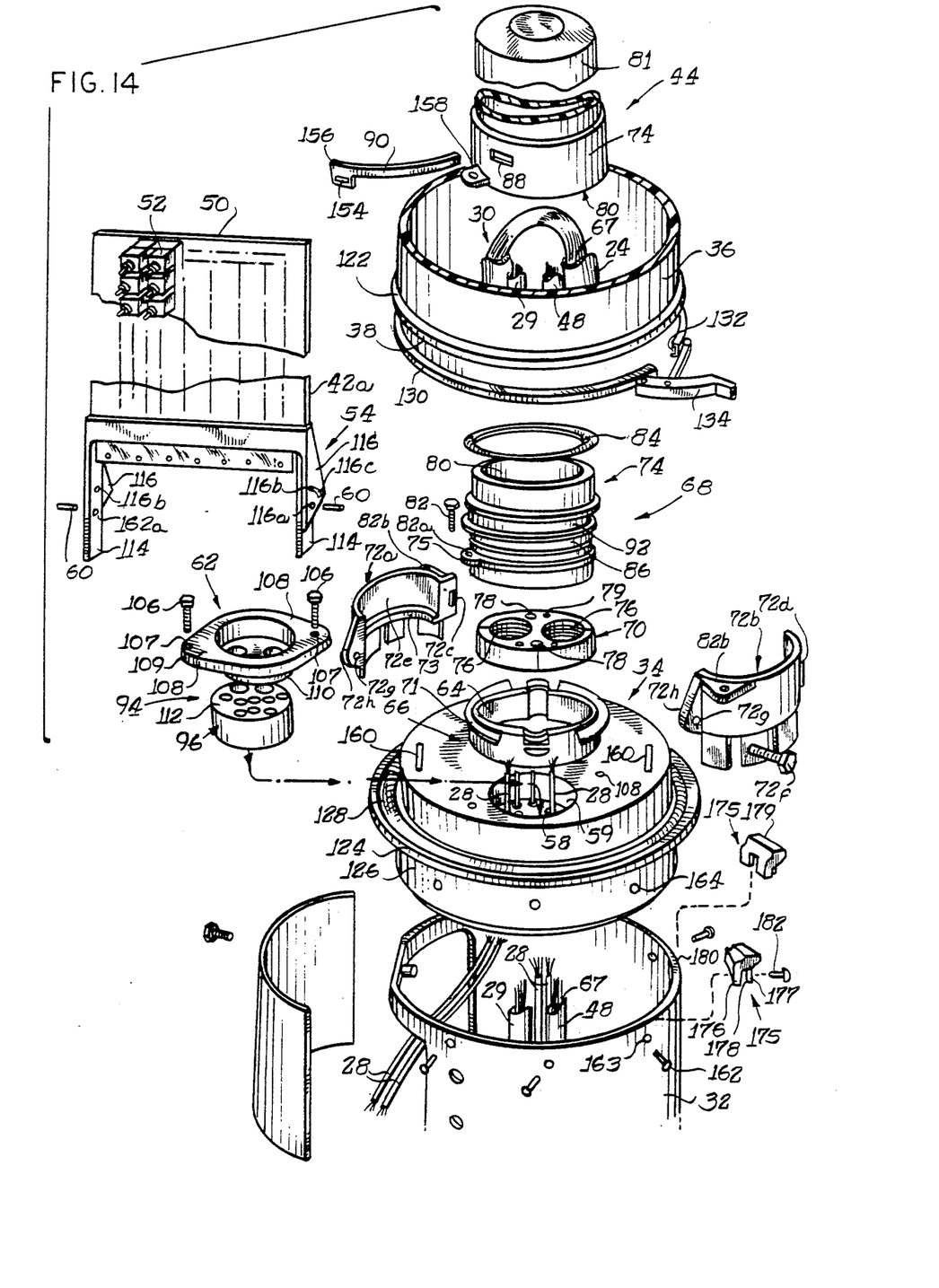
FIG. 14 is an exploded perspective view of the environmentally sealed pedestal of the present invention.

With further reference to FIGS. 6, 7 and 14 the interrelationship of the components of the pedestal 20 will be described in further detail. While different configurations may be employed in forming the mating or engageable components of the pedestal 20, the preferred embodiment shown in FIG. 14 shows these components as being generally circular in shape, while the components employed in the splice enclosure 44 are generally oval. As shown in FIG. 14, the primary cables 24 project upwardly through the base portion 32 and extend through a splice connection aperture 64 and are aligned projecting through a surrounding projecting funnel-shaped aperture 66 integrally formed with the bulkhead member 34. The looped portion 30 of the primary cables 24 has a portion of an outer jacket 67 removed so that splice connections 31 may be made with the secondary cables 48. As shown in FIG. 3, the primary cables 24 and the secondary cables 48 extend through the splice connection aperture 64 and are sealed therein by splice connection sealing means 68.

The splice connection sealing means 68 includes a first resilient sealing member 70 and a two piece shell member 72. The two piece shell member 72 is formed with a first half portion 72a and a second half or portion 72b. The first portion 72a is formed with a hinge portion 72c which hingedly engages a hinge pin 72d formed in the second portion 72b. Once the hinge portion 72c and the hinge pin 72d are engaged, the two shell portions 72a, 72b are retainably engaged by fastener 72f projecting through apertures 72g formed through flanges 72h opposite the hinge portions 72c, 72d. The first and second portions 72a, 72b form an oval or circular inner surface or receptacle 72e when joined. The first resilient sealing member 70 is retained in the receptacle 72e and is longitudinally or axially compressed therein between the shell member 72 and a seal neck portion 74.

Figure 8:
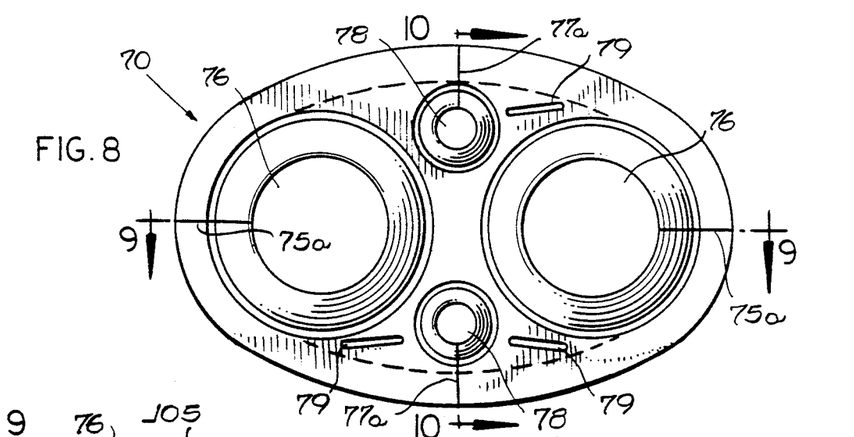
FIG. 8 is a plan view of a splice sealing member employed in a reenterable splice enclosure portion of the present invention.
Figure 9:
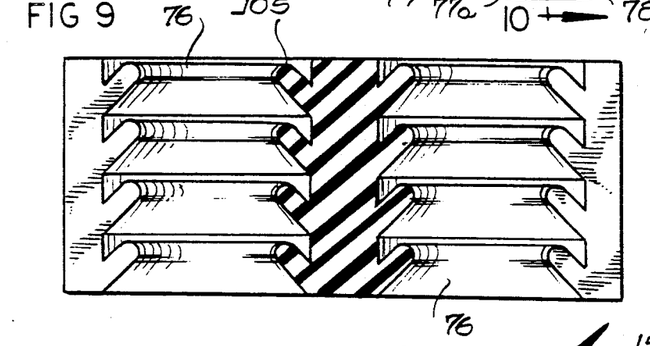
FIG. 9 is a cross-sectional view of the splice sealing member taken approximately along line 9—9 in FIG. 8.
Figure 10:
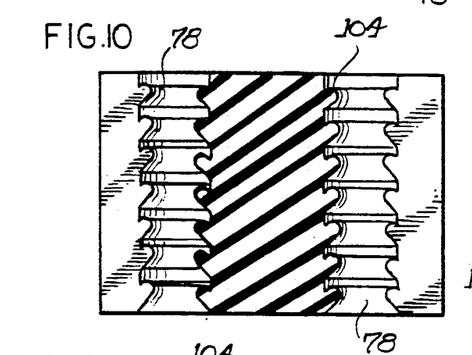
FIG. 10 is a cross-sectional view of the splice sealing member taken approximately along line 10—10 in FIG. 8.

Sealing of the primary cable 24 and the secondary cables 48 in the splice connection aperture 64 and projecting funnel-shaped aperture 66 is accomplished by engaging a channel 73 formed inside the receptacle 72e of the shell member 72 with a flange 71 cooperatively formed on the projecting funnel-shaped aperture 66 and positioning first resilient sealing member 70 inside the receptacle 72e formed between the two pieces 72a, 72b of the shell 72. As shown in FIG. 8, primary and secondary cable apertures 76, 78 and ground strap apertures 79 are formed through the first resilient sealing member 70 permitting passage of the primary and secondary cables 24, 48 and a ground bus 79a (shown in FIG. 1) therethrough.

A seal neck portion 74 of the splice enclosure 44 is formed with a central aperture 80 through which the primary and secondary cables 24,48 pass. The seal neck portion 74 is positioned on top of the first resilient sealing member 70 retained in the shell member 72. The seal neck 74 is forcibly pressed into the assembled shell 72 so as to axially compress the sealing member 70 retained therein. The seal neck portion 74 is attached by means of fasteners 82 inserted through apertures 82a on the sealing neck 74 and apertured flanges 82b on shell 72. Engagement of the sealing neck 74 to the shell member 72 maintains axial compression on the first resilient sealing member 70 retained therebetween to form a secure releaseable seal between the sealing member 70 and the cables 24, 48 passing therethrough as well as between the sealing member 70 and projecting funnel-shaped aperture 66, seal neck portion 74, and the shell member 72. A suitable cooperating flange 75 may also be provided on the seal neck 74 to promote correct engagement with shell 72.

With the splice connection sealing means 68 attached to the bulkhead 34 the splice enclosure 44 is attached thereto for sealing the splice connections retained therein. A seal is created between an upper sleeve or cover portion 81 of the splice enclosure 44 and its seal neck portion 74 by a gasket member 84 positioned therebetween. The gasket member 84 is positioned and retained in a groove 86 formed on the seal neck base portion 74. The cover 81 is formed with a spline aperture 88 for receiving a spline 90 therethrough. A spline receiving groove 92 is formed on the seal neck portion 74 for receiving the spline member 90 when the cover 81 is positioned over the seal neck portion 74. A complementary aligned spline receiving groove 92a is formed on an inner surface of the cover 81. Spline member 90 is inserted through the spline aperture 88 to engage the spline receiving grooves 92, 92a formed on the seal neck portion 74 and on the inside of the cover 81 to retain the cover 81 on the seal neck portion 74.

With reference to FIG. 14, once the spline 90 has been fully inserted through the spline aperture 88 and the receiving grooves 92, 92a, a slot 154 formed through a tab portion 156 formed on the end of the spline 90 defines a hasp-like structure which may be engaged with a staple or locking tab 158 formed on the outside of the cover 81. Engagement of the slot 154 with the staple may be retained by a further securing device or lock attached to the staple 158 to prevent unintended or unauthorized release of the cover 81 from the seal neck portion 74.

When the splice enclosure 44 is positioned and engaged as described hereinabove, the splice connections 31 retained therein are protected from detrimental environmental effects. The cover member 81 may be selectively removed and reattached as necessary in an extremely efficient manner without complications such as requiring additional sealing materials or special tools.

Figure 11:
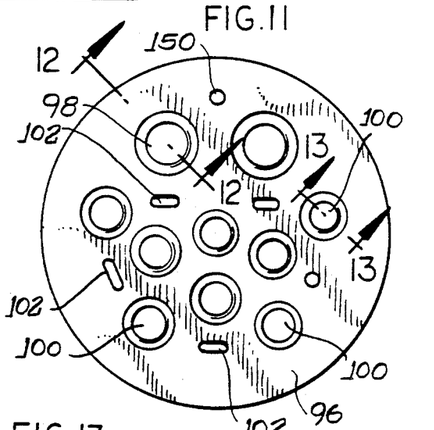
FIG. 11 is a plan view of a service cable sealing member.

A similar sealing operation is employed to seal the secondary cables 48 and the service cables 28 passing through the service cable aperture 58 formed in the bulkhead 34. Service cable sealing means 94 are employed to seal the service cables 28 and the secondary cables 48. The service cable sealing means 94 include the above-mentioned compression member 62 and a second resilient sealing member 96. The second resilient sealing member 96 is shown in greater detail in FIGS. 11, 12, and 13. FIG. 11 illustrates secondary cable apertures 98, respective service cable and aerial drop wire apertures 100 and 102 and ground wire aperture 150 formed in the sealing member 96.

Figure 12:
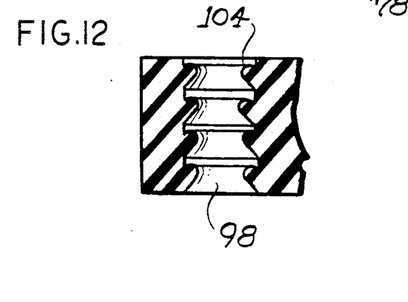
FIG. 12 is a partial cross-sectional view taken approximately along line 12—12 of FIG. 11.
Figure 13:
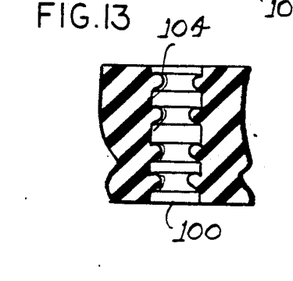
FIG. 13 is a partial cross-sectional view taken approximately along 13—13 in FIG. 11.

As shown in FIGS. 12 and 13, the apertures 98, 100 are formed with flexible annular frustoconical rings 104 circumferentially lining the inside surface of each of the apertures 98, 100. The flexible annular rings 104 project upwardly and inwardly from the surfaces of the apertures 98, 100 at an angle of approximately 45 degrees, and terminate in rounded inner edges. The flexible annular form of the rings 104 resiliently accommodates irregularities on the outside of the cables as well as a range of diameters to assure a secure seal. Other means of accommodating the irregularities of the outside of the cable or different cable sizes may be employed than those shown in FIGS. 12 and 13, without departing from the invention.

Similarly, the primary and secondary cable apertures 76, 78 formed through the first sealing member 70 are circumferentially formed with flexible annular rings 105 having a similar configuration and achieving the same function as described with regard to the second resilient sealing member 96. The sealing action of the flexible annular rings 104, 105 on the insides of the respective apertures assures a secure seal between the apertures and the cables passing therethrough when the sealing member 70 is compressed axially.

Figure 15:
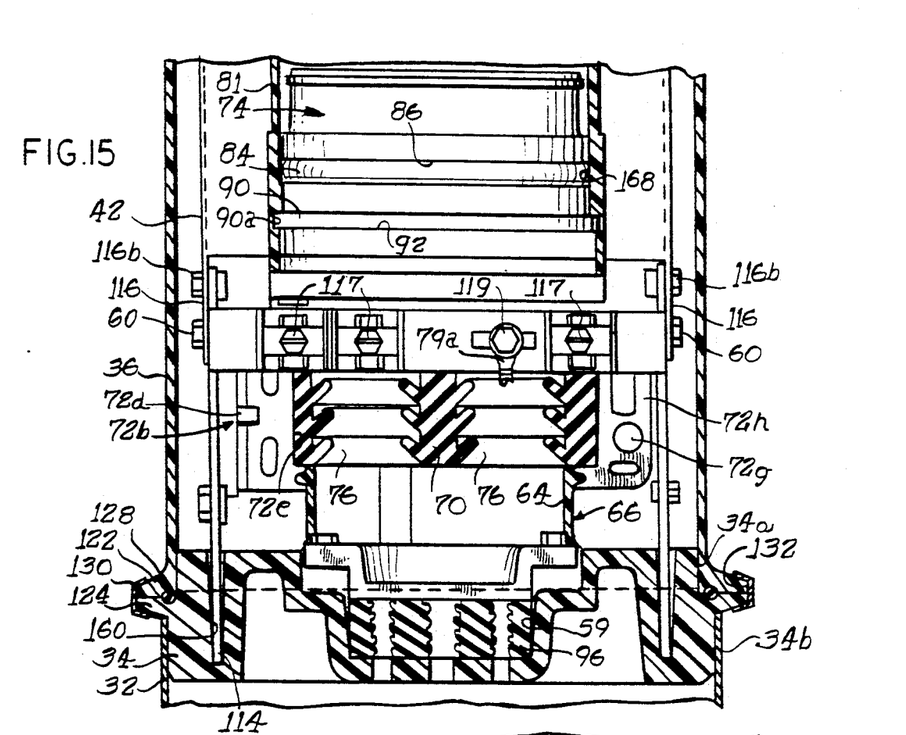
FIG. 15 is a partial, cross-sectional view of the environmentally sealed pedestal taken approximately along line 15—15 in FIG. 2.

The second resilient sealing member 96 is positioned inside a recess 59 in the bulkhead 34 which surrounds the service cable apertures 58. The sealing member 96 is compressed by the compression member 62 positioned thereabove towards the recess 59 in the bulkhead member 34 by fasteners 106 inserted through apertures 107 and engaged with bores 108 formed in the bulkhead 34. As shown in FIG. 15 the compression member 62 engages a top surface 112 of the second resilient sealing member 96, which is positioned in the recess 59. A flange portion 109 is formed with fastener receiving apertures 107 therethrough to promote axial compression and alignment of the sealing member 96. It should be noted that the apertures 98, 100, 102 and 150 formed through the second resilient sealing member 96 align with the apertures 58 and also with the corresponding apertures 99, 101, 103 and 151 formed through the compression member 62.

The sealing members 70, 96 described herein above are composed of a material chosen to provide sealing of the pedestal 20 over a range of environmental stress factors including exposure to moisture, temperature, pressure and certain chemicals. The material chosen should provide optimum hydrolytic stability, low water absorption, resistance to dry heat aging, have a low compression set, and also be resistant to pollution chemicals commonly found in surface soil water tables. Ideally, the material should not vary appreciably from its initial properties when subjected to such stress factors in the field. Preferably, the material should provide acceptable sealing characteristics at approximately 70° F. and maintain acceptable sealing properties over a full range of temperatures from −40° F. to +140° F.

For example, a preferred set of criteria for sufficient sealing include a minimum tensile strength of the material of substantially on the order of 70 psi; a minimum elongation of at least substantially on the order of 300%; minimum tear resistance of substantially on the order of 10 lbf/in; and compression set after 8 days at 70° F. under 25% compression of no more than about 2.5%, no more than about 1.3%, and no more than about 0.8%, respectively, measured 1 hour, 24 hours and 7 days, respectively, after release of compression at the end of the 8 days. Preferably, at least the first and second resilient sealing members 70, 96 are formed of a polyether or polyester based polyurethane with a Shore A hardness of 5 to 40 but preferably on the order of A7 to A20. An example of a material satisfying these criteria is designated as Dexthane 200 which is a material made by Dexter/Hysol Corporation of Seabrook, New Hampshire. Another material satisfying most of the foregoing criteria is designated as Exthane 400 which is a material made by Dexter/Hysol Corporation of Seabrook, New Hampshire. While Dexthane 400 satisfies most of the foregoing criteria, it has a nominal hardness of 40 Shore A. Therefore, the Dexthane 200 material is preferred.

Figure 16:
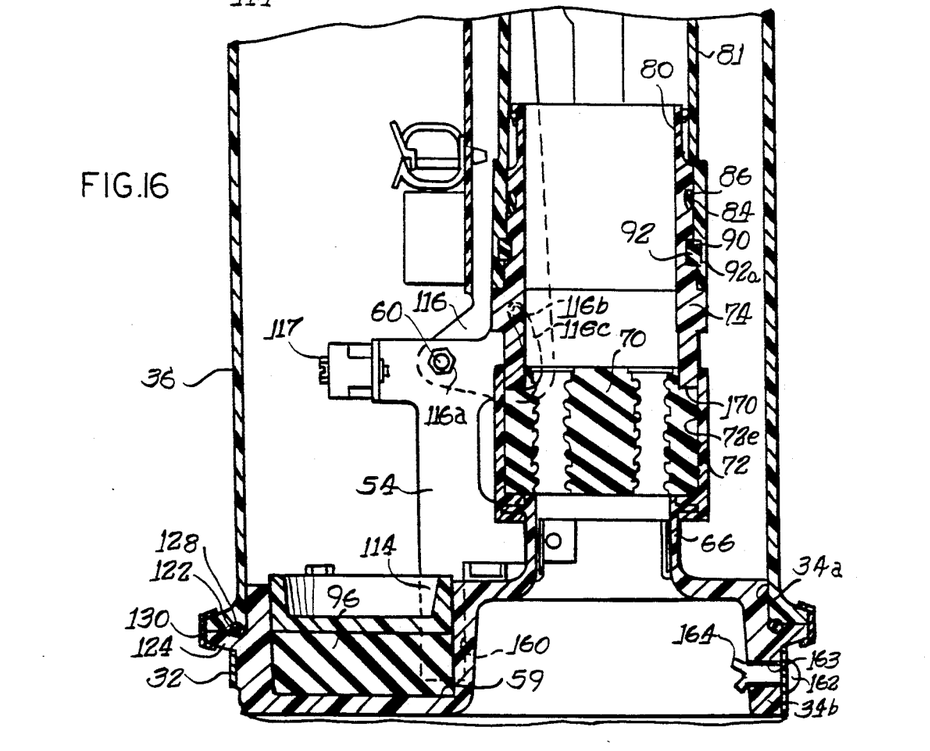
FIG. 16 is a partial, cross-sectional view of the environmentally sealed pedestal taken along line 16—16 in FIG. 1.

As shown in FIGS. 1, 2, 3 and 14, the bracket 54 comprises mounting members 114 insertable in sockets 160 in the bulkhead 34. The frame 42a has a base 116 which is attached to the mounting member 114 by a pivot pin 60 pivotally inserted in an aperture 116a formed therethrough. As mentioned above, the plate member 42a may have one or more terminal blocks 52 attached thereto. The plate member 42a and attached terminal blocks 52 can pivot about pivot pin 60 forwardly away from the splice enclosure 44 to permit access to the back 50 of the plate member 42a as well as to permit more open access to the contents of the splice enclosure 44 when operations are to be affected thereon. The degree of movement of the plate 42a is limited by a pin 116b anchored to bracket 54 and inserted through the arcuate slot 116c formed in its base portion 116. The slot 116c as shown in FIG. 16 permits movement through a range of approximately 45°0 although other ranges of movement may be achieved by appropriately modifying the slot 116c.

The bracket 54 is formed of a conductive metal and includes terminal lugs 117 for electrically joining all of the ground straps and or ground bars in the pedestal. At least one further lug 119 is provided to receive ground bus 79a, which projects through apertures 150 and 151, and an aligned one of apertures 58 into the pedestal base 32. Pedestal base is provided with a ground lug 123 for receiving ground bus 79a inside of base 132 and lug 123 also projects through the base 32 to be connected to further grounding means if desired.

The dome member 36 attaches to the bulkhead member 34 independently of the splice enclosure 44. A dome flange 122 is formed on the open end 38 of the dome member 36 and is alignable and engageable with a cooperatively formed bulkhead flange 124 formed on a peripheral surface 126 of the bulkhead member 34. A perimeter sealing member 128 is retained on the bulkhead member 34 abutting the bulkhead flange 124 and is enqageable with the dome flange 122 for sealing the dome 36 to the bulkhead member 34. Selective attachment means such as a V-band clamp 130 engages both the dome flange 122 and the bulkhead flange 124 forming a seal with the perimeter sealing member 128 positioned therebetween.

The spring clip band 130 is formed with a channel 132 which engages the dome flange 122 and the bulkhead flange 124. Initial positioning of the dome member 36 on a radially reduced shoulder 34a of the bulkhead 34 permits ease of installation when the spring clip band 130 is initially engaged with the bulkhead member 34 and the dome member 36 in preparation for sealing. The V-band clamp 130 operates with an over center locking clip 134 which draws opposite ends of the V-band clamp 130 towards each other to decrease the circumference of the V-band clamp 130 thereby pressing together flanges 122, 124 at their generally flared or bevelled outer surfaces, thereby compressing the sealing member 128 therebetween.

FIGS. 15 and 16 are cross-sectional views taken along lines 15—15 in FIG. 2 and line 16—16 of FIG. 1, respectively. It should be noted that cables passing through the bulkhead have been omitted from FIGS. 15 and 16 in the interest of clarity. As shown in FIG. 15, the bulkhead 34 is in the assembled state as illustrated in FIGS. 1 and 2. The dome 36 is releaseably engaged with the bulkhead 34 by means of the V-band clamp 130 engaging the dome flange 122 and the bulkhead flange 124. The engagement between the dome 36 and the bulkhead 34 is sealed by the sealing member 128 positioned therebetween. A reduced diameter portion 34b of the bulkhead member 34 is inserted into the base member 32 in a sleeve-like manner and retained thereon by rivets 162 (shown in FIG. 16) inserted through aligned rivet bores 163, 164 formed through the base 32 and the bulkhead 34. The connecting portion 42 attached to the base member 116 and the attachment 114 is engaged with the slots 160 formed in the bulkhead 34.

FIGS. 14, 15 and 16 illustrate the sealing and engagement of the components comprising the pedestal 20. As shown in FIGS. 15 and 16, the cover 81 is positioned over the sealing neck member 74. The cover 81 is retained on the neck member 74 by the spline 90 inserted through the spline groove 92 formed on the neck 74 and the cooperatively formed cover spline groove 92a formed on an inside surface 168 of the cover 81. Sealing of the cover 81 against the neck member 74 is effected by the O-ring 84 retained in the O-ring groove 86 formed on the neck member 74 compressed against the inside surface 168 of the cover 81. The neck member 74 is engaged with the assembled split shell 72 such that a downwardly facing edge 170 (FIG. 16) compresses the first resilient sealing member 70 retained inside the receptacle 72e of the split shell 72. With reference to FIG. 14, a fastener 82 is inserted through aperture 82a formed through the flange 75 on the neck 74. A corresponding flange and aperture (see FIG. 3) are formed for receiving a fastener on the opposite side of the neck 74 but are not shown in FIG. 14 due to the angle of the perspective.

The fasteners 82 inserted through the apertures 82a of the flange 75 are engaged with the apertured flanges 82b formed on the split shell portions 72a, 72b. Engagement of the neck 74 with the assembled split shell 72 axially compresses the first resilient sealing member 70 therebetween. Likewise, the sealing plate 62 axially compresses the second resilient sealing member 96 positioned in the recess 59.

Turning again to FIG. 14, temporary mounting clips 175 are shown for use in attaching the dome 36 to the base 32 prior to installation of the bulkhead 34. The mounting clips 175 have forward legs 176 and a rear leg 177 defining a slot 178 therebetween. The slot 178 is positioned over an edge 180 of the base 32 with the forward legs 176 inside the base 32 and the rear leg 177 positioned on the outside of the base 32. With reference to FIGS. 15 and 16, a top portion 179 of the temporary clip 175 has a cross-section substantially identical to that of the bulkhead flange 124. The rear leg 177 is formed with an aperture therethrough (not shown) for receiving a temporary plastic rivet 182 which is inserted through the aperture 164 formed through the base portion 32.

Thus retained on the base portion 32, the clips 175 may be engaged by the ring clamp 130 to attach the dome 36 to the base 32 prior to installation of the bulkhead 34. The ability to install the present invention without installing the bulkhead 34 is highly advantageous. For example, when the primary cable 24 is buried beneath the ground 26, it is extended above the ground in a loop 30 for splicing the appropriate connections thereto. However, installation of the primary cable 24 (as noted in the Background of the Invention hereinabove) is carried out by a cable-laying contractor who may not have the requisite training to provide the required cable connections. Since the necessary connections can be highly technical and require substantial training, special telecommunication technicians make the necessary connections. However, since the sheath 67 covering the primary cable 24 is generally rigid and rather inflexible, the sheath 67 must be removed in order to insert the cable through the neck aperture 64.

Therefore, using the present invention, the cable-laying contractor may install the entire pedestal 20 except for the bulkhead member 34 and the necessary connections. This permits allocation of the tasks, manual tasks to the contractor and technical tasks to the connection technician, and protects the primary cable 24 extending above the ground surface 26. When the connection technician arrives to make the requisite splice connections 31 to the primary cable 24 and the terminal block connections, the dome 36 is removed from the base 32. Once the dome is removed, the temporary clips 175 are also removed and the sheath 67 on the loop portion 30 is removed. Once the sheath is removed, the cable is flexible enough to be inserted through the aperture 64 in the bulkhead 34. Once the loop 30 is inserted through the aperture 64 of the bulkhead 34, the bulkhead 34 is attached to the base portion 32 using the permanent rivets 162 inserted through the apertures 164.

While particular embodiments of the present invention have been shown and described in detail herein, it may be obvious to those skilled in the art that changes and modifications of the present invention in its various aspects, may be made without departing from the invention and its broader aspects, some of which changes and modifications being matter of routine engineering or design and others being apparent after study. As such, the scope of the invention should not be limited by the particular embodiments and specific constructions described herein, but should be defined by the appended claims and equivalents thereof. Accordingly, the aim of the appended claims is to cover all such changes and modifications as fall within the true spirit and scope of the invention.

The invention is claimed as follows:

1. A sealed reenterable protective housing for protecting telecommunications equipment and splice connections therebetween from detrimental environmental effects, said protective housing comprising: a base portion, a rigid bulkhead member mounted to said base portion, a dome member selectively attachable to said rigid bulkhead member and sealing means for selectively sealing said dome member to said rigid bulkhead member; a sealed reenterable splice enclosure mounted to said rigid bulkhead member within said dome; a sealing member positioned between said splice enclosure and said bulkhead, said sealing member having means for accepting at least one entering cable segment and at least one exiting cable segment passing through said sealing member, said sealing member being axially compressed between said splice enclosure and said bulkhead for sealing said splice enclosure; said dome being selectively reenterable for access to the contents thereof while maintaining said splice enclosure in said sealed condition; and said splice enclosure being selectively disengageable from said rigid bulkhead member for providing reenterable access thereto.

2. A reenterable protective housing according to claim 1, further including a connecting portion mounted to said bulkhead and within said dome for connecting cables exiting said splice enclosure to cables exiting said protective housing, said connecting portion being protected from detrimental environmental effects when said dome is attached to said bulkhead and accessible when said dome is removed from said bulkhead.

3. A reenterable protective housing for protecting telecommunications equipment from detrimental environmental effects, said housing comprising: a base portion, a rigid bulkhead portion mounted to said base portion, a dome member being selectively attachable to said rigid bulkhead portion, primary sealing means for selectively sealing said dome member to said rigid bulkhead member and a reenterable splice enclosure contained in said dome member and secondary sealing means, said secondary sealing means being positioned between and axially compressed between said reenterable splice enclosure and said rigid bulkhead portion for sealing said splice enclosure to said rigid bulkhead member independently of said dome member.

4. A reenterable protective housing according to claim 3, wherein said bulkhead defines a splice connection aperture formed through said bulkhead for receiving at least one primary cable and at least one secondary cable therethrough, and wherein said secondary sealing means includes splice connection sealing means engageable with said splice connection aperture for sealing with said at least one primary cable and said at least one secondary cable, said splice enclosure also being selectively attachable to said splice connection sealing means; wherein said bulkhead defines a service cable aperture formed through said bulkhead for receiving at least one service cable therethrough and further including service cable sealing means engageable with said service cable aperture for sealing around at least one service cable passing therethrough.

5. A reenterable protective housing according to claim 4, wherein said splice connection sealing means includes a shell member and a first resilient sealing member, said shell member being engageable with said splice connection aperture and said first resilient sealing member being retained in said shell member, apertures formed through said first resilient sealing member for receiving said at least one primary and said at least one secondary cable passing therethrough, said splice enclosure being engageable with said shell member for axially compressing said first sealing member therebetween, and said first resilient sealing member being responsive to said axial compression for sealing said shell member and said cables passing therethrough.

6. A reenterable protective housing according to claim 4, wherein said service cable sealing means comprise a compression member and a second resilient sealing member, at least one aperture formed through said second resilient sealing member through which at least one service cable projects, said second resilient sealing member being alignable with said service cable aperture and said compression member engaging and axially compressing said second resilient sealing member against said bulkhead, said second resilient sealing member being responsive to said axial compression for sealingly engaging said bulkhead, said service cable aperture and said service cable.

7. A reenterable protective housing according to claim 3, wherein said primary sealing means comprises: a dome flange formed on a distal end of said dome, a bulkhead flange formed on a perimeter of said bulkhead, a perimeter sealing member positioned between said dome flange and said bulkhead flange and clamping means engaging said dome flange and said bulkhead flange for releaseably clamping said dome member to said bulkhead and for compressing said perimeter sealing member between said dome flange and said bulkhead flange.

8. A sealed reenterable protective housing for protecting telecommunications equipment from detrimental environmental effects, said protective housing comprising: a base portion, a bulkhead member mounted to said base portion, a dome member selectively attachable to said bulkhead member and sealing means for selectively sealing said dome member to said bulkhead member; a sealed reenterable splice enclosure mounted to said bulkhead member within said dome; said dome being selectively reenterable for access to contents thereof while maintaining said splice enclosure in a sealed condition; said splice enclosure being selectively disengageable from said bulkhead member for providing reenterable access to splice connections retained therein; a connecting portion mounted to said bulkhead member within said dome for connecting cables exiting said splice enclosure to cables exiting said protective housing, said connection portion being protected from detrimental environmental effects when said dome is attached to said bulkhead and accessible when said dome is removed from said bulkhead member.

9. A reenterable protective housing according to claim 2, wherein said connection portion comprises a terminal block assembly for providing efficient connecting of cables exiting said splice enclosure to cables exiting said protective housing, said terminal block assembly including a terminal block and bracket means for mounting said terminal blocks to said bulkhead.

10. A reenterable protective housing according to claim 2, and further including first cable sealing means for sealing cable entering and exiting said dome relative to said bulkhead, second cable sealing means for sealing cable entering and exiting said splice enclosure relative to said bulkhead, whereby cable may be routed to and from said connecting portion and said splice enclosure independently through said first and second sealing means, respectively.

11. A reenterable telecommunications equipment housing for protecting telecommunications equipment retained therein from detrimental environmental effects, said housing comprising: a base portion, a bulkhead member attached to said base member and a hollow dome member having one open end releaseably sealable with said bulkhead member; a compartment defined by said releaseably sealing of said dome member to said bulkhead member containing a reenterable splice enclosure and a connecting portion, said splice enclosure protecting contents thereof from detrimental environmental effects when said dome member is removed from said bulkhead member.

12. A reenterable housing according to claim 11, wherein said bulkhead member is formed with an integral funnel-shaped aperture portion and a service cable aperture, and further including a shell member, a compression member and first and second sealing members having apertures formed therethrough; said funnel-shaped aperture portion projecting from said bulkhead member for receiving said shell member attached thereto; said shell member retaining said first sealing member therein and being engageable with said splice enclosure; said first sealing member being releaseably axially compressed between said splice enclosure and said shell member for sealing said splice enclosure; a recess in said bulkhead member for retaining said second sealing member; said service cable aperture being formed in said recess; said compression member being sized and dimensioned for releaseably engaging and axially compressing said second sealing member retained in said recess; said first and second sealing members sealing against cables projecting through said apertures formed therethrough when said first and said second sealing members are axially compressed.

13. A reenterable housing according to claim 12, and further including flexible annular rings formed on an inside surface of said apertures formed through said first and second sealing members for sealing with any of a plurality of cables over a predetermined range of sizes when said first and second sealing members are axially compressed.

14. A reenterable housing according to claim 12, wherein radial slits are selectively formed in said first and second sealing members intersecting predetermined ones of said apertures formed through said first and second sealing members.

15. A reenterable housing according to claim 12, wherein said first and second sealing members are single piece bodies integrally formed of a resiliently compressible material.

16. A reenterable housing according to claim 15, wherein said first and second sealing members are characterized by, hydrolytic stability, resistance to dry heat aging, low compression set, and resistance to atmospheric and water-borne substances.

17. A reenterable housing according to claim 15, wherein said first and second sealing members are formed of a material characterized by, tensile strength of at least substantially on the order of 70 psi, elongation of at least substantially on the order of 300%, tear resistance of at least substantially on the order of 10 lbf/in, and compression set of less than substantially on the order of 8% after 8 days at 70° F. with under 25% compression.

18. A sealed reenterable protective housing for protecting telecommunications equipment from detrimental environmental effects, said protective housing comprising: a base portion, a separate bulkhead member mounted to said base portion, a dome member selectively attachable to said bulkhead member and sealing means for selectively sealing said dome member to said bulkhead member; cooperating means on said base and said dome member such that said dome member is attachable to said base portion independently of said bulkhead member and further cooperating means on said bulkhead member such that said bulkhead member may be attached to said base portion and said dome member attached thereto subsequent to initial installation of said base portion and dome member.

19. A reenterable protective housing for protecting telecommunications equipment from detrimental environmental effects, said housing comprising: a base portion, a bulkhead member mounted to said base portion, a splice connection aperture formed through said bulkhead member for receiving at least one primary cable and at least one secondary cable therethrough; a dome member being selectively attachable to said bulkhead member; primary sealing means for selectively sealing said dome member to said bulkhead member; and a reenterable splice enclosure contained in said dome member and secondary sealing means for sealing said splice enclosure to said bulkhead member independently of said dome member, said secondary sealing means including splice connection sealing means engageable with said splice connection aperture for sealing with said at least one primary cable and said at least one secondary cable; said splice connection sealing means comprising a shell member and a first resilient sealing member, said shell member being engageable with said splice connection aperture and said first resilient sealing member being retained in said shell member, apertures formed through said first resilient sealing member for receiving said primary and secondary cable passing therethrough, said splice enclosure being engageable with said shell member for axially compressing said first sealing member therebetween, and said first resilient sealing member being responsive to axial compression for sealing said shell member and said cables passing therethrough; said splice enclosure also being selectively attachable to said splice connection sealing means; a service cable aperture formed through said bulkhead member for receiving at least one service cable therethrough and further including service cable sealing means engageable with said service cable aperture for sealing with said at least one service cable.

20. A reenterable protective housing for protecting telecommunications equipment from detrimental environmental effects, said housing comprising: a base portion, a bulkhead member mounted to said base portion, a splice connection aperture formed through said bulkhead member for receiving at least one primary cable and at least one secondary cable therethrough; a dome member being selectively attachable to said bulkhead member; primary sealing means for selectively sealing said dome member to said bulkhead member; a reenterable splice enclosure contained in said dome member and secondary sealing means for sealing said splice enclosure to said bulkhead member independently of said dome member, said secondary sealing means including splice connection sealing means engageable with said splice connection aperture for sealing with said at least one primary cable and said at least one secondary cable; said reenterable splice enclosure also being selectively attachable to said splice connection sealing means; a service cable aperture formed through said bulkhead member for receiving at least one service cable therethrough and further including service cable sealing means engageable with said service cable aperture for sealing with said at least one service cable; said service cable sealing means comprise a compression member and a second resilient sealing member, at least one aperture formed through said second resilient sealing member through which said at least one service cable projects, said second resilient sealing member being alignable with said service cable aperture and said compression member engaging and axially compressing said second resilient sealing member against said bulkhead, said second resilient sealing member being responsive to axial compression for sealingly engaging said bulkhead, said service cable aperture and said service cable.

21. A reenterable protective housing for protecting telecommunications equipment from detrimental environmental effects, said housing comprising: a base portion, a bulkhead member mounted to said base portion, a dome member being selectively attachable to said bulkhead member; primary sealing means for selectively sealing said dome member to said bulkhead member; said primary sealing means comprising a dome flange formed on a distal end of said dome, a bulkhead flange formed on a perimeter of said bulkhead member, a perimeter sealing member positioned between said dome flange and said bulkhead flange and clamping means engaging said dome flange and said bulkhead flange for releaseably clamping said dome member to said bulkhead member and for compressing said perimeter sealing member between said dome flange and said bulkhead flange; and a reenterable splice enclosure contained in said dome member and secondary sealing means for sealing said splice enclosure to said bulkhead member independently of said dome member.

* * * * *

UNITED STATES PATENT AND TRADEMARK OFFICE
CERTIFICATE OF CORRECTION

PATENT NO. : 5,117,067
DATED : May 26, 1992
INVENTOR(S) : Donald F. Jaycox

It is certified that error appears in the above-identified patent and that said Letters Patent is hereby corrected as shown below:

Column 13, line 41 "wherein said connection portion"

should read -- wherein said connecting portion --

Signed and Sealed this

Twenty-fourth Day of August, 1993

Attest:

BRUCE LEHMAN

Attesting Officer     Commissioner of Patents and Trademarks